May 19, 1953     D. F. JORGENSEN     2,639,164
ROLLER DEVICE FOR MOVING HEAVY OBJECTS
Filed Aug. 13, 1949
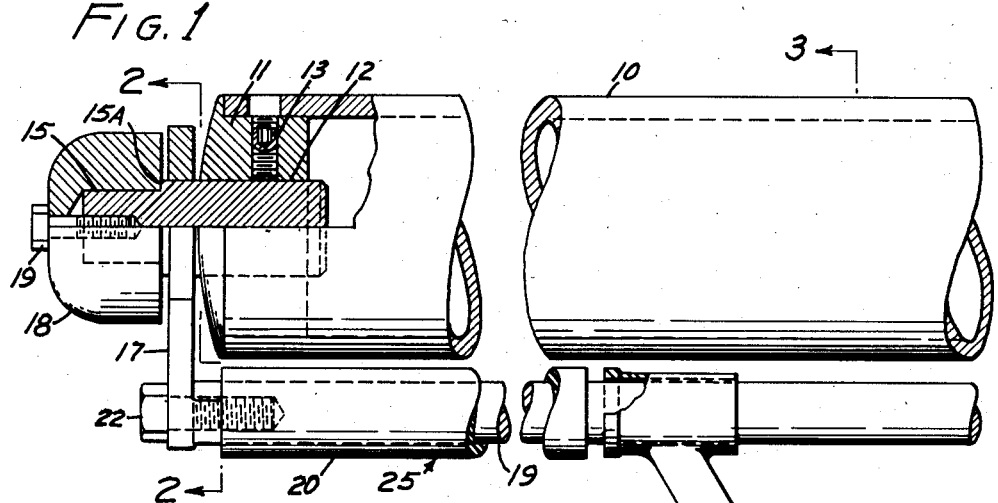
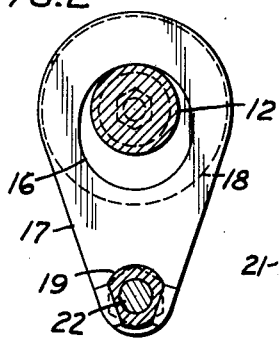
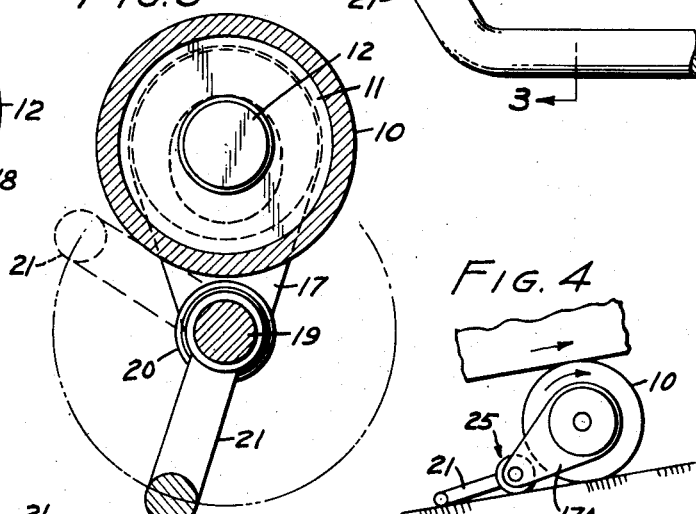
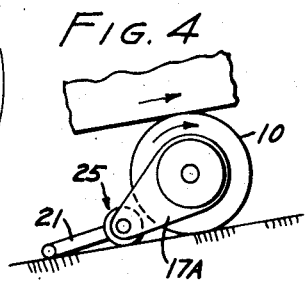
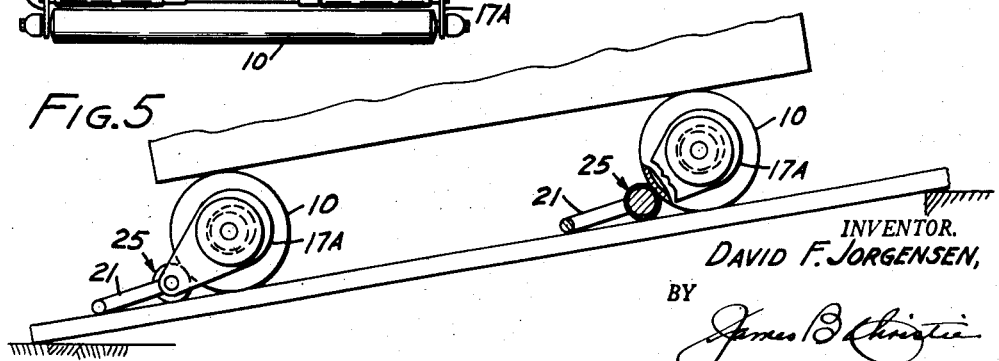
INVENTOR.
DAVID F. JORGENSEN,
BY
*James B. Christie*
ATTORNEY.

Patented May 19, 1953

2,639,164

UNITED STATES PATENT OFFICE 2,639,164

ROLLER DEVICE FOR MOVING HEAVY OBJECTS

David F. Jorgensen, Altadena, Calif.

Application August 13, 1949, Serial No. 110,140

6 Claims. (Cl. 280—47.32)

1

This invention relates to a roller designed to move furniture, machinery and other heavy objects.

It is a common practice to employ rollers to facilitate the transportation of heavy objects such as machinery, furniture, etc. A conventional roller is a piece of three or four inch pipe. One or more of these are placed underneath the object to be moved, say a crated piece of heavy machinery, which may then be moved along flat surfaces or inclines. However, the danger is always present that the load will reverse its direction, particularly in the case of inclined surfaces. Such a reversal endangers the workman and often results in damage to the load.

In accordance with my invention, I provide a roller in which this undesirable feature is eliminated. This is accomplished by the addition of braking means acting in conjunction with the roller itself to prevent uncontrolled descent of the roller down an incline or a reversal of the direction of travel on any surface.

The apparatus of the invention is particularly adapted for use in the loading of a truck where it is necessary to use planks on an incline to raise the load to the level of the truck bed. However, the apparatus is not limited to the transportation of heavy objects up an incline. It may be used any place where loading is a factor, for instance, in the moving of timbers in a mine or in the moving of material on construction jobs. With the apparatus of the invention the load may be left unattended on the rollers, if necessary.

In general, the apparatus of the invention comprises a cylindrical roller, provided with a drag disposed behind it in such position that the roller jams against it upon counter rotation. Thus the drag may be loosely journalled on the axis of the roller and disposed behind it, so that the roller upon reversing its direction of rotation, jams against the drag, which in turn jams against the surface over which the roller has moved, and thus prevents further counter-rotation.

In its preferred form, the apparatus of the invention comprises a roller, an elongated drag member disposed behind the roller in close parallel relationship, and loose journal means connecting the two ends of the drag to the respective ends of the roller and permitting the roller to move out of contact with the drag as it is rolled in a forward direction, but to come in contact with the drag if it is rolled backward. In other words, the drag is loosely coupled to the roller, the play between them being sufficient to permit the roller to roll back against the drag

2 and jam. These and other aspects of the invention will be more clearly understood in the light of the following detailed description taken in conjunction with the accompanying drawings in which:

Fig. 1 is a fragmentary side elevation, partially in section, of a preferred form of the roller of the invention;

Fig. 2 is a section taken on the line 2—2 of Fig. 1;

Fig. 3 is a section taken on line 3—3 of Fig. 1;

Fig. 4 is an end view of the apparatus of Fig. 1 showing its manner of use and the disposition of its parts in forward travel;

Fig. 5 is an end view of the apparatus illustrating the braking mechanism in operation; and Fig. 6 is a side elevation of the apparatus being transported by hand.

The embodiment of Fig. 1 comprises a cylindrical member or roller 10, a bushing 11 mounted in one end of the roller and a similar bushing (not shown) mounted in the opposite end of the roller. A shaft 12 is mounted coaxially within the bushing 11 and projects outwardly therefrom. The shaft is secured by a recessed set screw 13. This prevents rotation of the shaft with respect to the bushing and the roller.

The outer end 15 of the shaft 12 is of reduced diameter so that there is an annular shoulder 15A on the shaft. A cap 18 is mounted on the end of the shaft, and abuts against the shoulder. The cap is held on the shaft by a screw 19 threaded through the end of the shaft.

The other end of the roller is constructed in a like manner with similar bushing, shaft and cap.

A pair of hangers 17 and 17A (see Fig. 6) are mounted on the respective shafts at the ends of the roller and a drag or braking mechanism 25 is suspended between the projecting ends of the two hangers. In Fig. 1, the hanger 17 is shown mounted loosely on the shaft 12 between the roller and the cap, with the shaft extending through an elliptical hole 16 in the hanger (see Fig. 2). The preferred embodiment uses an elliptical hole, although any hole substantially larger than the cross section of the shaft is satisfactory.

The drag comprises an elongated rod 19 mounted at opposite ends to the hangers 17, 17A, a pair of rubber sleeves 20, 20A and a handle 21, as shown in Fig. 6. The elongated rod is attached between the pair of hangers by screws 22, 22A, and lies parallel to the cylindrical member. The rubber sleeves are shown as cylindrical in shape but may be of any desired cross section such as rectangular, triangular, ellipsoidal or octagonal. The handle is slidably journalled on the elongated rod between the rubber sleeves which are rigidly mounted on the elongated rod. In Fig. 3 the handle 21 is shown to be pivotal about the longitudinal axis of the rod 19.

When the roller is in motion, no member of the braking mechanism 25 rotates. Only the roller 10, the bushings 11, 11A, the shafts 12, 12A, and the caps 18, 18A turn upon their common axis. Thus, when the roller is moving forward on a level surface or upwardly on an incline, the braking mechanism 25 drags freely behind, and out of contact with the roller, as shown in Fig. 4. The elliptical holes in the hangers permit the drag to ride free of the roller. Should the forward motion cease, and reversal start, then the cylindrical member will be held in a locked position, as shown in Fig. 5. Thus the roller upon reversing its direction of rotation, backs against the rubber sleeves and jams. The friction of the rubber against the surface upon which the roller is operating and against the roller itself prevents counter-rotation.

In the preferred embodiment as described herein, the sleeves 20 and 20A are made of rubber, say sections of air hose, but any material may be employed which has high coefficients of friction relative to the roller and to the surface upon which the roller is operating.

The caps 18, 18A are smaller in diameter than the roller 10 and are preferably of a rugged construction to permit the use of a pry bar engaging the caps to shift the roller when necessary.

It is to be understood that the form of my invention, herein described and illustrated, is a preferred embodiment and that various changes may be resorted to without departing from the spirit of my invention, or scope of the claims. For example, the roller and the drag could be held apart by a spring. If the roller should reverse its direction, it would over-come the strength of the spring and jam against the drag. The drag in turn would jam against the surface upon which the mechanism was operating.

I claim:

1. An apparatus for moving heavy objects comprising a roller, a pair of hangers, a separate one of said hangers being mounted at each end of said roller, an elongated rod suspended between the hangers, a handle slidably mounted on said elongated rod, and a pair of sleeves having high coefficients of friction with the surface upon which said roller is operating and with said roller, said pair of sleeves being mounted on said elongated rod and spaced on opposite sides of said handle, with the hangers being loosely journaled on the roller to provide a play which permits jamming of the roller against the sleeves upon counter-rotation of the roller.

2. An apparatus for moving heavy objects comprising a roller, a separate shaft projecting outwardly and coaxially from each end of said roller, a cap mounted over the outer end of each shaft, a pair of hangers, a separate one of said hangers being loosely journaled on each of said shafts between said roller and said cap, and means mounted between said hangers behind the roller and close to it with the play of the loosely journaled hangers being such that the roller jams against said means when the roller rolls backward.

3. An apparatus for moving heavy objects comprising a roller, a separate shaft projecting outwardly and coaxially from each end of said roller, a cap mounted over the outer end of each shaft, a pair of hangers, a hole in each hanger substantially larger than the cross section of the said shaft to give the hangers play on the shaft, a separate one of said hangers being mounted on each of said shafts between said roller and said cap, and means mounted between said hangers for preventing backward motion of the said roller, and comprising a member disposed close to the roller, the distance between the roller and the member being less than the play of the hangers on the shaft.

4. An apparatus for moving heavy objects comprising a roller, a bushing mounted in each end of the said roller, a shaft projecting outwardly and coaxially from each bushing, a cap mounted over the outer end of each shaft, a pair of hangers with elliptical holes to permit substantial play of the hangers on the shaft, the hangers being mounted respectively on the shaft ends between said roller and said cap with the shaft projecting through the elliptical holes, an elongated rod suspended between said hangers and lying parallel to said roller, a handle slidably journalled on said elongated rod, and a pair of rubber sleeves mounted on said elongated rod and spaced on opposite sides of said handle, the elliptical holes being large enough to permit substantial play of the hangers on the shaft, and the sleeves being disposed close to the roller, so that the roller can roll backward against them.

5. An apparatus for moving heavy objects comprising a roller, a pair of hangers loosely journaled to the opposite ends of said roller to give a play between the roller and the hanger, an elongated rod suspended between said hangers substantially parallel to the roller and closely adjacent thereto, an object having a high coefficient of friction with both the surface upon which the roller is operating and the face of the roller mounted upon the elongated rod, the play between the roller and the hanger being such that the roller jams against said object upon counter-rotation of the roller.

6. An apparatus for moving heavy objects comprising a roller, a pair of hangers journaled to the opposite ends of the roller, an elongated rod suspended between the hangers substantially parallel to the roller and adjacent thereto, the hangers being loosely connected to one of the rollers and the rod to provide play between the roller and the rod, an object having a high coefficient of friction with both the surface upon which the roller is operating and the face of the roller mounted upon the elongated rod, the play between the roller and the rod being such that the roller jams against the object upon counter-rotation of the roller.

DAVID F. JORGENSEN.

References Cited in the file of this patent

UNITED STATES PATENTS

| Number | Name | Date |
|---|---|---|
| 476,065 | Pomroy | May 31, 1892 |
| 828,633 | Stuart | Aug. 14, 1906 |
| 1,625,161 | Roos | Apr. 19, 1927 |
| 1,708,090 | Hague | Apr. 9, 1929 |
| 2,216,418 | McNally | Oct. 1, 1940 |

FOREIGN PATENTS

| Number | Country | Date |
|---|---|---|
| 26,147 | Great Britain | Nov. 9, 1911 |